(12) United States Patent
Miyazaki et al.

(10) Patent No.: US 12,475,209 B2
(45) Date of Patent: Nov. 18, 2025

(54) INFORMATION PROCESSING DEVICE, INFORMATION PROCESSING METHOD, AND INFORMATION PROCESSING SYSTEM

(71) Applicant: FELICA NETWORKS, INC., Tokyo (JP)

(72) Inventors: Nozomi Miyazaki, Tokyo (JP); Seiji Kawamura, Tokyo (JP); Yasumasa Nakatsugawa, Tokyo (JP)

(73) Assignee: FELICA NETWORKS, INC., Tokyo (JP)

( * ) Notice: Subject to any disclaimer, the term of this patent is extended or adjusted under 35 U.S.C. 154(b) by 517 days.

(21) Appl. No.: 17/632,572

(22) PCT Filed: Jul. 31, 2020

(86) PCT No.: PCT/JP2020/029381
§ 371 (c)(1),
(2) Date: Feb. 3, 2022

(87) PCT Pub. No.: WO2021/029232
PCT Pub. Date: Feb. 18, 2021

(65) Prior Publication Data
US 2022/0277068 A1    Sep. 1, 2022

(30) Foreign Application Priority Data
Aug. 15, 2019 (JP) .................. 2019-149163

(51) Int. Cl.
*G06F 21/44* (2013.01)
*G06F 11/14* (2006.01)

(52) U.S. Cl.
CPC .......... *G06F 21/44* (2013.01); *G06F 11/1458* (2013.01)

(58) Field of Classification Search
None
See application file for complete search history.

(56) References Cited

U.S. PATENT DOCUMENTS

2005/0055604 A1* 3/2005 Chen ............... G06F 1/3228
714/13
2005/0138397 A1    6/2005 Kusudo et al.
(Continued)

FOREIGN PATENT DOCUMENTS

CN    1894968 A    1/2007
CN    105187410 A    12/2015
(Continued)

OTHER PUBLICATIONS

International Search Report and Written Opinion of PCT Application No. PCT/JP2020/029381 issued on Oct. 20, 2020, 10 pages of ISRWO.

*Primary Examiner* — Syed A Roni
(74) *Attorney, Agent, or Firm* — CHIP LAW GROUP (57) ABSTRACT

Provided is an information processing device, an information processing method, and an information processing system that enable safe movement of data in an application. The information processing device includes a control unit that executes first software, second software, and third software, backs up data in the first software to the second software in a case where first authentication between the first software and the second software succeeds, and moves the data backed up in the second software to the third software in a case where second authentication between the second software and the third software succeeds.

18 Claims, 6 Drawing Sheets

(56) References Cited

U.S. PATENT DOCUMENTS

| | | | |
|---|---|---|---|
| 2008/0027868 A1* | 1/2008 | Ljung | G06F 21/1073 |
| | | | 705/51 |
| 2010/0030982 A1* | 2/2010 | Sela | G06F 21/64 |
| | | | 726/21 |
| 2011/0126183 A1* | 5/2011 | Bernard | G06Q 20/3552 |
| | | | 717/168 |
| 2012/0233419 A1* | 9/2012 | Yamashita | G06F 11/1461 |
| | | | 711/E12.103 |
| 2012/0254850 A1 | 10/2012 | Hido et al. | |
| 2018/0145969 A1* | 5/2018 | Agrawal | H04L 63/105 |
| 2020/0097280 A1* | 3/2020 | Simeonov | G06F 8/656 |

FOREIGN PATENT DOCUMENTS

| | | |
|---|---|---|
| CN | 109445815 A | 3/2019 |
| JP | 2002-049434 A | 2/2002 |
| JP | 2007-041694 A | 2/2007 |
| JP | 2007-515092 A | 6/2007 |
| JP | 2008-158801 A | 7/2008 |
| JP | 2012-212380 A | 11/2012 |
| JP | 2014-029688 A | 2/2014 |
| KR | 10-2006-0118540 A | 11/2006 |
| WO | 2005/060255 A1 | 6/2005 |

\* cited by examiner

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2020/029381 filed on Jul. 31, 2020, which claims priority benefit of Japanese Patent Application No. JP 2019-149163 filed in the Japan Patent Office on Aug. 15, 2019. Each of the above-referenced applications is hereby incorporated herein by reference in its entirety.

TECHNICAL FIELD

The present technology relates to an information processing device, an information processing method, a program, and an information processing system, in particular to an information processing device, an information processing method, a program, and an information processing system that enable safe movement of data in software.

BACKGROUND ART

It has been proposed conventionally that, in a case where an operating system is updated, when an updater device is authenticated, and the authentication is successful, a new operating system is acquired from the updater device and installed (refer to Patent Document 1, for example).

Furthermore, for example, in a case where software is updated, backup software may be used to move data in software before the update to the software after the update. For example, the backup software backs up the data in the software before the update, and after the update of the software is completed, the backed-up data is moved to the software after the update.

CITATION LIST

Patent Document

Patent Document 1: Japanese Patent Application Laid-Open No. 2014-29688

SUMMARY OF THE INVENTION

Problems to be Solved by the Invention

However, in a case where the backup software is malicious fake software, there is a risk of eavesdropping or falsification of data.

The present technology has been developed in view of the above circumstances, and is to enable safe movement of data in software.

Solutions to Problems

An information processing device according to a first aspect of the present technology includes a control unit that executes first software, second software, and third software, the information processing device backing up data in the first software to the second software in a case where first authentication between the first software and the second software succeeds, and moving the data backed up in the second software to the third software in a case where second authentication between the second software and the third software succeeds.

An information processing method according to the first aspect of the present technology includes backing up data in first software to second software in a case where first authentication between the first software and the second software succeeds, and moving the data backed up in the second software to third software in a case where second authentication between the second software and the third software succeeds.

A program according to the first aspect of the present technology causes a computer to execute processing including backing up data in first software to second software in a case where first authentication between the first software and the second software succeeds, and moving the data backed up in the second software to third software in a case where second authentication between the second software and the third software succeeds.

An information processing system according to a second aspect of the present technology includes a first information processing device and second information processing device, and the first information processing device includes a control unit that executes first software, second software, and third software, and, in a case where the first software is updated to the third software according to an order from the second information processing device, backs up data in the first software to the second software when first authentication between the first software and the second software succeeds, and moves the data backed up in the second software to the third software in a case where second authentication between the second software and the third software succeeds.

In the first aspect of the present technology, data in first software is backed up to second software in a case where first authentication between the first software and the second software succeeds, and the data backed up in the second software is moved to third software in a case where second authentication between the second software and the third software succeeds.

In the second aspect of the present technology, in a case where the first software is updated to the third software according to an order from a second information processing device, data in the first software is backed up to the second software when first authentication between the first software and the second software succeeds, and the data backed up in the second software is transmitted to the third software in a case where second authentication between the second software and the third software succeeds.

MODE FOR CARRYING OUT THE INVENTION

Hereinafter, an embodiment for carrying out the present technology will be described. The description will be made in the following order.
1. Embodiment
2. Modifications
3. Others

1. Embodiment

An embodiment of the present technology will be described with reference to FIGS. 1 to 5.
<Configuration Example of Information Processing System 1>

Figure 1:
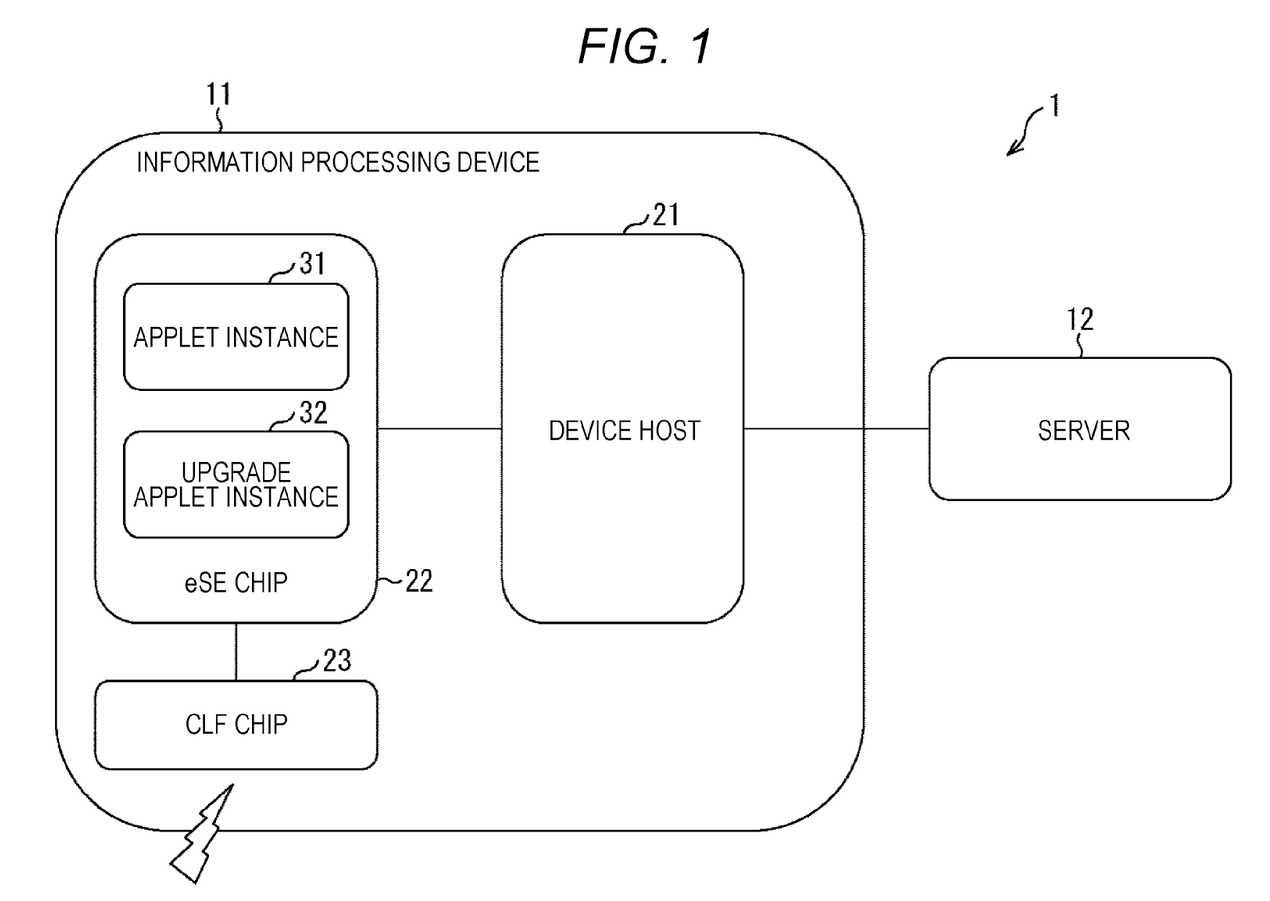
FIG. 1 is a block diagram illustrating a configuration example of an information processing system to which the present technology is applied.

FIG. 1 is a block diagram illustrating a configuration example of an information processing system 1 to which the present technology is applied.

The information processing system 1 includes an information processing device 11 and a server 12.

The information processing device 11 includes, for example, a smartphone, a tablet terminal, a personal computer, a mobile telephone, or the like, and communicates with another information processing device such as the server 12 or performs various kinds of information processing.

The information processing device 11 includes a device host 21, an embedded Secure Element (eSE) chip 22, and a contactless front-end (CLF) chip 23.

The device host 21 includes a processor such as a central processing unit (CPU), a memory, or the like, and controls the entire information processing device 11, executes various kinds of processing, communicates with the server 12, or the like.

The eSE chip 22 is a tamper-resistant embedded chip, and holds, for example, highly confidential data. Furthermore, the eSE chip 22 executes software such as an applet 31 and an upgrade applet 32.

The applet 31 is application software including a predetermined function.

The upgrade applet 32 is application software including functions of, when the applet 31 is updated (upgraded), backing up data held inside the applet 31 (hereinafter, referred to as internal data) before the update, and moving the data to the applet 31 after the update.

Note that, hereinafter, in a case where the applet 31 before the update and the applet 31 after the update are distinguished from each other, the former is referred to as an old applet 31a, and the latter is referred to as a new applet 31b. Furthermore, hereinafter, instances (instances) of the applet 31 and upgrade applet 32 are referred to as an applet instance 31 and an upgrade applet instance 32, respectively, by using the same reference signs. Similarly, instances of the old applet 31a and new applet 31b are referred to as an old applet instance 31a and a new applet instance 31b, respectively, by using the same reference signs.

The CLF chip 23 is a chip including a function of near field communication (NFC, near field wireless communication). The CLF chip 23 performs near field wireless communication with another information processing device, and exchanges various kinds of software, data, commands, or the like. The CLF chip 23 supplies the eSE chip 22 with received software, data, command, or the like, or acquires, from the eSE chip 22, software, data, command, or the like to be transmitted.

The server 12 communicates with the device host 21 of the information processing device 11 via an unillustrated network or the like, and exchanges various kinds of software, data, commands, or the like. For example, the server 12 transmits a package for updating the applet 31 to the device host 21, or transmits various kinds of commands to the device host 21, the eSE chip 22, and the CLF chip 23.
<Processing of Updating Applet 31>

Figure 2:
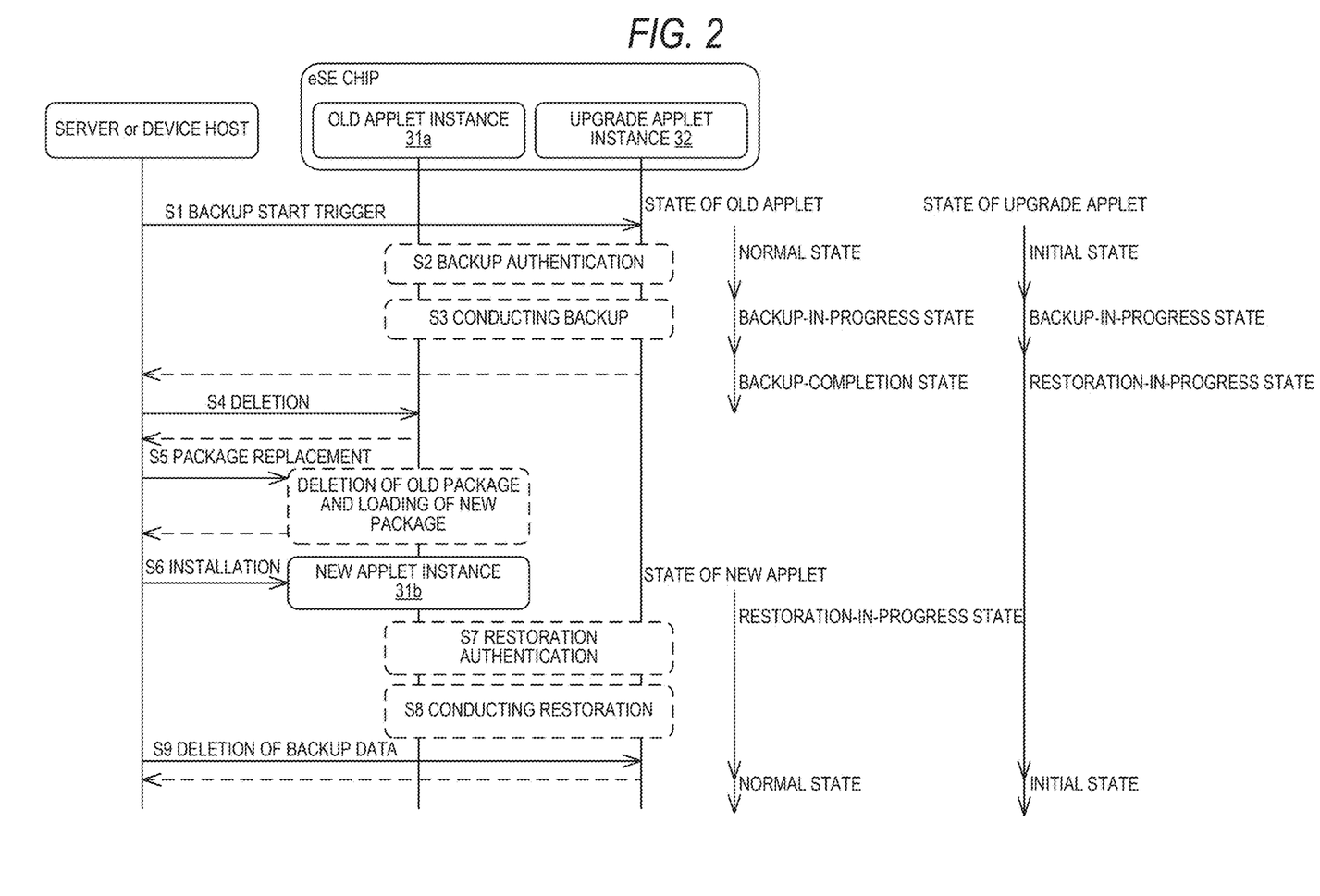
FIG. 2 is a sequence diagram for describing processing of updating an applet.

Next, processing of updating the applet 31 executed by the information processing system 1 will be described with reference to the sequence diagram in FIG. 2.

Note that it is assumed that, before the update processing is executed, an internal state of the old applet 31a is set to a normal state, and an internal state of the upgrade applet 32 is set to an initial state. The internal states of the old applet 31a, new applet 31b, and upgrade applet 32 will be described later with reference to FIG. 5.

Furthermore, it is assumed that the old applet instance 31a, the new applet instance 31b, and the upgrade applet instance 32 previously hold a common key.

In Step S1, the server 12 or the device host 21 transmits a backup start trigger to the upgrade applet instance 32.

Note that a method for issuing an order, such as a backup start trigger, from the server 12 or the device host 21 to the upgrade applet instance 32 is arbitrary.

For example, the server 12 may transmit, to the device host 21, a command for issuing an order to the upgrade applet instance 32, and the device host 21 may forward the command to the upgrade applet instance 32. For example, the server 12 may transmit, to the device host 21, a script (program) for issuing an order to the upgrade applet instance 32, and the device host 21 may supply the command to the upgrade applet instance 32 by executing the script. For example, the device host 21 may supply a command to the upgrade applet instance 32 by executing a previously stored script (program).

In Step S2, before backup processing, the old applet instance 31a and the upgrade applet instance 32 perform backup authentication. Details of the backup authentication will be described later with reference to FIG. 3, and here, an overview of the backup authentication will be described.

First, the upgrade applet instance 32 transmits a challenge message to the old applet instance 31a.

The old applet instance 31a generates an authentication value by using the received challenge message and the internally held common key, and transmits the authentication value to the upgrade applet instance 32.

By using the internally held common key, the upgrade applet instance 32 verifies the authentication value received from the old applet instance 31a.

In a case where it is determined that the authentication value is not normal, the backup authentication becomes an error, and the backup authentication is stopped.

Meanwhile, in a case where it is determined that the authentication value is normal, the upgrade applet instance 32 generates an authentication value by using the authentication value received from the old applet instance 31a and the internally held common key, and transmits the authentication value to the old applet instance 31a.

By using the internally held common key, the old applet instance 31a verifies the authentication value received from the upgrade applet instance 32.

In a case where it is determined that the authentication value is not normal, the backup authentication becomes an error, and the backup authentication is stopped.

Meanwhile, in a case where it is determined that the authentication value is normal, that is, in a case where the backup authentication succeeds, the processing proceeds to Step S3. Furthermore, the internal state of the old applet 31a transitions from the normal state to a backup-in-progress state, and the internal state of the upgrade applet 32 transitions from the initial state to the backup-in-progress state.

In Step S3, the old applet instance 31a and the upgrade applet instance 32 conduct backup. Specifically, the old applet instance 31a encrypts the internal data (hereinafter, referred to as backup data) to be transferred to the new applet instance 31b, and transmits the encrypted backup data to the upgrade applet instance 32. The upgrade applet instance 32 internally accumulates the received backup data.

Then, after the backup of the backup data is completed, the internal state of the old applet 31a transitions from the backup-in-progress state to a backup-completion state. Furthermore, the internal state of the upgrade applet 32 transitions from the backup-in-progress state to a restoration-in-progress state. Furthermore, the upgrade applet instance 32 notifies the server 12 or the device host 21 of the completion of the backup.

In Step S4, the server 12 or the device host 21 deletes the old applet instance 31a from the eSE chip 22. The eSE chip 22 notifies the server 12 or the device host 21 of completion of the deletion of the old applet instance 31a.

In Step S5, the server 12 or the device host 21 replaces a package. Specifically, the server 12 or the device host 21 deletes a package for the old applet 31a from the eSE chip 22, and loads a package for the new applet 31b on the eSE chip 22. The eSE chip 22 notifies the server 12 or the device host 21 of completion of the replacement of the package.

In Step S6, the server 12 or the device host 21 installs the new applet 31b by using the package for the new applet 31b loaded on the eSE chip 22. With this arrangement, the new applet instance 31b is generated. Furthermore, the internal state of the new applet 31b is set to the restoration-in-progress state.

In Step S7, before restoration processing, the new applet instance 31b and the upgrade applet instance 32 perform restoration authentication. Details of the restoration authentication will be described later with reference to FIG. 4, and here, an overview of the restoration authentication will be described.

Specifically, in the restoration authentication, unlike the backup authentication, first, a challenge message is transmitted from the upgrade applet instance 32 to the new applet instance 31b. Then, the new applet instance 31b and the upgrade applet instance 32 perform authentication processing in opposite positions to the old applet instance 31a and upgrade applet instance 32 in the backup authentication.

Then, in a case where an error occurs, the restoration authentication is stopped.

Meanwhile, in a case where the restoration authentication succeeds, the processing proceeds to Step S8.

In Step S8, the new applet instance 31b and the upgrade applet instance 32 conduct restoration. That is, the upgrade applet instance 32 moves the accumulated backup data to the new applet instance 31b. With this arrangement, the internal data of the old applet instance 31a is restored to the new applet instance 31b.

In Step S9, the server 12 or the device host 21 deletes the backup data accumulated in the upgrade applet instance 32. Thereafter, the internal state of the upgrade applet 32 transitions from the restoration-in-progress state to the initial state, and the internal state of the new applet 31b transitions from the restoration-in-progress state to the normal state. Furthermore, the upgrade applet instance 32 notifies the server 12 or the device host 21 of completion of the deletion of the backup data.

Thereafter, the processing of updating the applet 31 ends.

<Details of Backup Authentication and Backup Processing>

Figure 3:
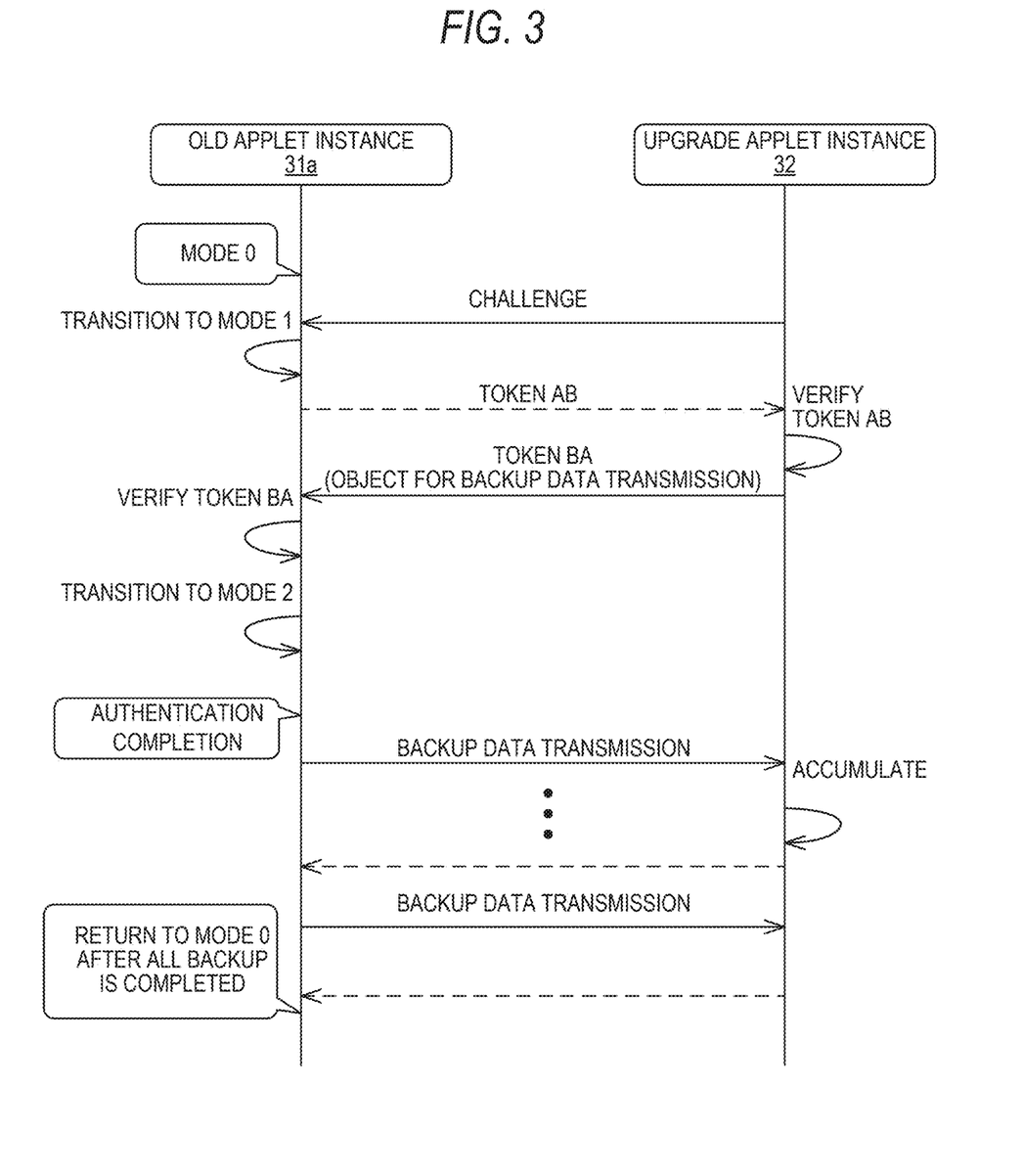
FIG. 3 is a sequence diagram for describing details of backup authentication.

Next, details of the backup authentication in Step S2 and the backup processing in S3 in FIG. 2 will be described with reference to the sequence diagram in FIG. 3.

The backup authentication is performed by, for example, a procedure conforming to ISO/IEC 9798-2 Three pass authentication.

Specifically, the upgrade applet instance 32 starts backup authentication triggered by receiving a backup request from the server 12 or the device host 21. The backup request includes an identifier of the applet 31 to be updated and information indicating a version of a new applet 31.

Whereas, the upgrade applet instance 32 transmits a challenge message to the old applet instance 31a.

Note that the old applet instance 31a has three levels of internal modes, which are Mode 0 to Mode 2. This internal mode is set independently of the above-described internal states.

Then, the old applet instance 31a accepts only the following messages in each of the internal modes, and returns an error and stops the backup authentication when receiving a message other than the following messages.

Mode 0: Challenge message
Mode 1: Token BA

Note that the message is mainly a command or the like exchanged in the eSE chip 22, and an external command to be described later is mainly a command issued from an outside of the eSE chip 22.

Moreover, the upgrade applet instance 32 executes backup processing only in a case where the internal mode is Mode 2.

Therefore, in a case where the internal mode is other than Mode 0, the old applet instance 31a does not accept the challenge message and returns an error to the upgrade applet instance 32. With this arrangement, the backup authentication is stopped.

Meanwhile, in a case where the internal mode is Mode 0, the old applet instance 31a accepts the challenge message. With this arrangement, the old applet instance 31a transitions from Mode 0 to Mode 1.

By using the received challenge message and the internally held common key, the old applet instance 31a calculates a value of Cipher-based MAC (CMAC) (hereinafter, referred to as a CMAC value) with the Advanced Encryption Standard (AES) algorithm. The old applet instance 31a generates a token AB including the CMAC value and information indicating a version of the old applet 31a (that is, the version of a current applet 31), and transmits the token AB to the upgrade applet instance 32.

The upgrade applet instance 32 verifies the token AB. For example, by using the internally held common key, the upgrade applet instance 32 verifies consistency of the CMAC value included in the token AB.

Furthermore, the upgrade applet instance 32 verifies consistency between the version of the old applet 31a included in the token AB and the version of the new applet 31 included in the backup request. That is, the upgrade applet instance 32 verifies whether or not the version of the new applet 31 is newer than the version of the old applet 31a.

The upgrade applet instance 32 stops the backup authentication in a case where it is determined, as a result of the verification, that the token AB is not normal, or that the version of the new applet 31 is not normal (is older than the version of the old applet 31a, or the same as the version of the old applet 31a).

Meanwhile, the upgrade applet instance 32 calculates a CMAC value with the AES algorithm by using the CMAC value included in the token AB and the internally held common key in a case where it is determined that the token AB is normal and the version of the new applet 31 is normal (is newer than the version of the old applet 31a). The upgrade applet instance 32 generates a token BA including the calculated CMAC value and information indicating the version of the new applet 31 included in the backup request, and transmits the token BA to the old applet instance 31a. Furthermore, the upgrade applet instance 32 transmits an object for backup data transmission to the old applet instance 31a. The object for backup data transmission is a program for transmitting backup data.

In a case where the internal mode is other than Mode 1, the old applet instance 31a does not accept the token BA and returns an error to the upgrade applet instance 32. With this arrangement, the backup authentication is stopped.

Meanwhile, in a case where the internal mode is Mode 1, the old applet instance 31a accepts the token BA. Then, the old applet instance 31a verifies the token BA. For example, by using the internally held common key, the old applet instance 31a verifies consistency of the CMAC value included in the token BA.

Furthermore, the old applet instance 31a verifies consistency between the version thereof and the version of the new applet 31, the version being included in the token BA. That is, the old applet instance 31a verifies whether or not the version of the new applet 31 is newer than the version of the old applet instance 31a.

The old applet instance 31a stops the backup authentication in a case where it is determined, as a result of the verification, that the token BA is not normal, or that the version of the new applet 31 is not normal.

Meanwhile, in a case where it is determined that the token BA is normal and the version of the new applet 31 is normal, the old applet instance 31a transitions from Mode 1 to Mode 2, and the backup authentication is completed.

Then, the old applet instance 31a performs backup processing by using the object for backup data transmission provided from the upgrade applet instance 32. That is, the old applet instance 31a encrypts the backup data and transmits the encrypted backup data to the upgrade applet instance 32. The upgrade applet instance 32 internally accumulates the received backup data in the encrypted state, and transmits a response message to the old applet instance 31a. After backup of all the backup data is completed, the old applet instance 31a returns from Mode 2 to Mode 0.

Thus, if the backup authentication is not performed according to a predetermined procedure, the internal mode of the old applet instance 31a does not normally transition, and therefore the backup authentication does not succeed. Furthermore, only in a case where the backup authentication is successful, backup processing is performed by using the object for backup data transmission provided from the upgrade applet instance 32. Therefore, the internal data of the old applet instance 31a can be safely backed up to the upgrade applet instance 32.

<Details of Restoration Authentication and Restoration Processing>

Figure 4:
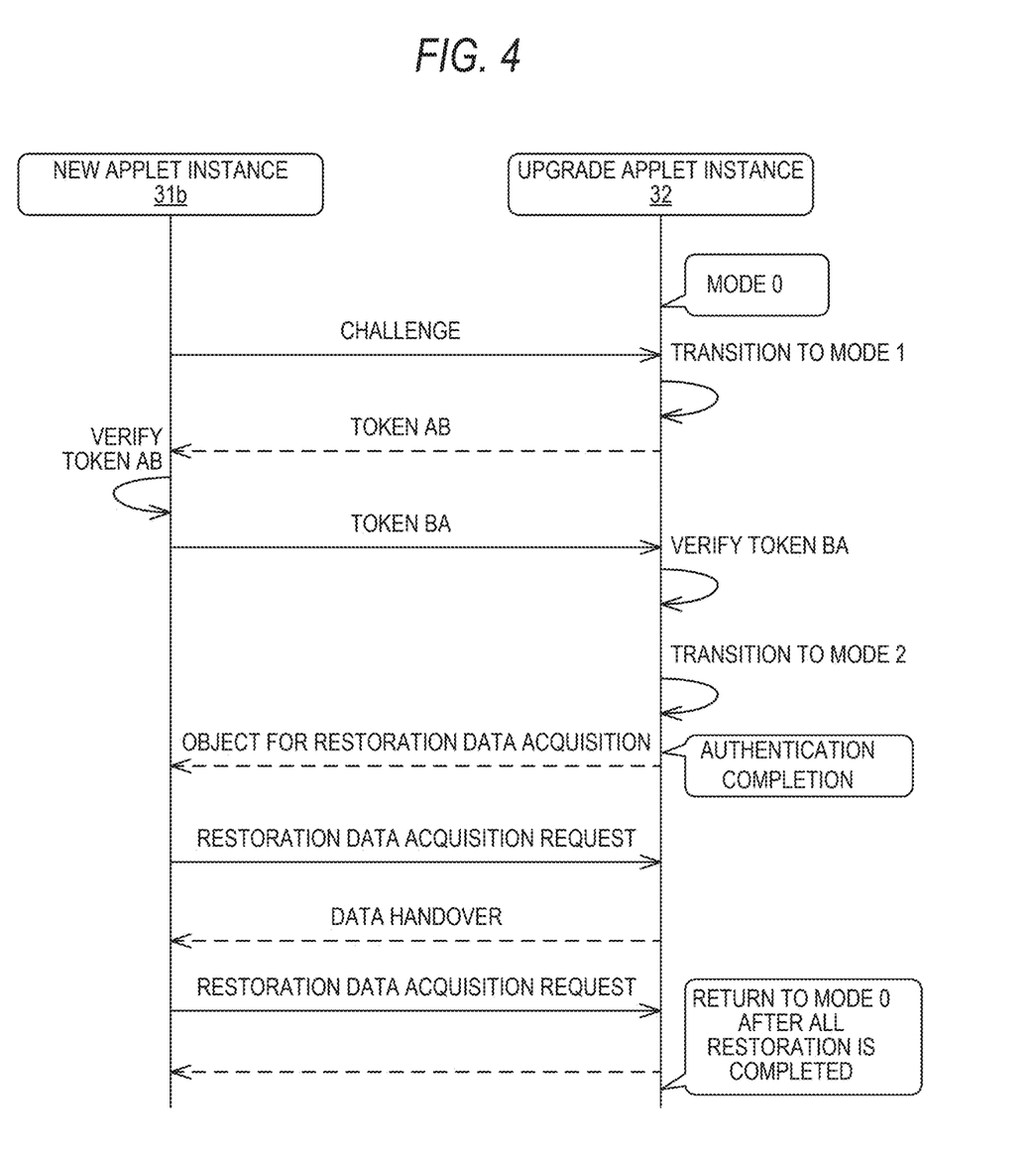
FIG. 4 is a sequence diagram for describing details of restoration authentication.

Next, details of the restoration authentication in Step S7 and the restoration processing in Step S8 in FIG. 2 will be described with reference to the sequence diagram in FIG. 4.

The restoration authentication is, similarly to the backup authentication for example, performed by a procedure conforming to ISO/IEC 9798-2 Three pass authentication.

The restoration authentication starts triggered by, in a state where the backup data is accumulated in the upgrade applet instance 32, the new applet 31b being installed on the eSE chip 22 and the new applet instance 31b being generated.

The new applet instance 31b transmits a challenge message to the upgrade applet instance 32.

Note that, similarly to the old applet instance 31a, the upgrade applet instance 32 has three levels of internal modes, which are Mode 0 to Mode 2. This internal mode is set independently of the above-described internal states.

Then, the upgrade applet instance 32 accepts only the following messages in each of the internal modes, and returns an error and ends the restoration authentication when receiving a message other than the following messages.

Mode 0: Challenge message
Mode 1: Token BA
Mode 2: Restoration data acquisition request Therefore, in a case where the internal mode is other than Mode 0, the upgrade applet instance 32 does not accept the challenge message and returns an error to the new applet instance 31b. With this arrangement, the restoration authentication is stopped.

Meanwhile, in a case where the internal mode is Mode 0, the upgrade applet instance 32 accepts the challenge message and transitions from Mode 0 to Mode 1.

The upgrade applet instance 32 calculates a CMAC value with the AES algorithm by using the received challenge message and the internally held common key. The upgrade applet instance 32 generates a token AB including the calculated CMAC value and information indicating the version of the new applet 31 included in the backup request received at a time of the backup authentication, and transmits the token AB to the new applet instance 31b.

The new applet instance 31b verifies the token AB. For example, by using the internally held common key, the new applet instance 31b verifies consistency of the CMAC value included in the token AB.

Furthermore, the new applet instance 31b verifies consistency between the version thereof and the version of the new applet 31, the version being included in the token AB. That is, the upgrade applet instance 32 verifies whether or not the version thereof matches the version of the new applet 31.

The new applet instance 31b stops the restoration authentication in a case where it is determined, as a result of the verification, that the token AB is not normal, or that the version of the new applet 31 is not normal (does not match the version of the new applet 31b).

Meanwhile, the new applet instance 31b calculates a CMAC value with the AES algorithm by using the CMAC value included in the token AB and the internally held common key in a case where it is determined that the token AB is normal and the version of the new applet 31 is normal (matches the version of the new applet 31b). The new applet instance 31b generates a token BA including the calculated CMAC value and information indicating the version of the new applet instance 31b, and transmits the token BA to the upgrade applet instance 32.

In a case where the internal mode is other than Mode 1, the upgrade applet instance 32 does not accept the token BA and returns an error to the new applet instance 31b. With this arrangement, the restoration authentication is stopped.

Meanwhile, in a case where the internal mode is Mode 1, the upgrade applet instance 32 accepts the token BA. Then, the upgrade applet instance 32 verifies the token BA. For example, by using the internally held common key, the upgrade applet instance 32 verifies consistency of the CMAC value included in the token BA.

Furthermore, the upgrade applet instance 32 verifies consistency between the version of the new applet 31*b* included in the token BA and the version of the new applet 31 included in the backup request. That is, the upgrade applet instance 32 verifies whether or not the version of the new applet 31*b* matches the version of the new applet 31 included in the backup request.

The upgrade applet instance 32 stops the restoration authentication in a case where it is determined, as a result of the verification, that the token BA is not normal, or that the version of the new applet 31 is not normal.

Meanwhile, in a case where it is determined that the token BA is normal and the version of the new applet 31 is normal, the upgrade applet instance 32 transitions from Mode 1 to Mode 2, and the restoration authentication is completed. Furthermore, the upgrade applet instance 32 transmits an object for restoration data acquisition to the new applet instance 31*b*. The object for restoration data acquisition is a program for acquiring backup data (restoration data) accumulated in the upgrade applet instance 32.

Whereas, the new applet instance 31*b* receives the object for restoration data acquisition. Then, the new applet instance 31*b* transmits a restoration data acquisition request to the upgrade applet instance 32 by using the object for restoration data acquisition provided from the upgrade applet instance 32.

Whereas, in a case where the internal mode is other than Mode 2, the upgrade applet instance 32 does not accept the object for restoration data acquisition and does not perform restoration processing.

Meanwhile, in a case where the internal mode is Mode 2, the upgrade applet instance 32 accepts the restoration data acquisition request, and transmits the internally accumulated encrypted backup data (restoration data) to the new applet instance 31*b*.

Exchange of the restoration data acquisition request and backup data (restoration data) corresponding thereto is repeated until all the backup data accumulated in the upgrade applet instance 32 is transmitted to the new applet instance 31*b*.

Then, after transmission of all the backup data is completed and the accumulated backup data is deleted, the upgrade applet instance 32 returns from Mode 2 to Mode 0.

Thus, if the restoration authentication is not performed according to a predetermined procedure, the internal mode of the upgrade applet instance 32 does not normally transition, and therefore the restoration authentication does not succeed. Furthermore, only in a case where the restoration authentication is successful, restoration processing is executed by using the object for restoration data acquisition provided from the upgrade applet instance 32. Therefore, the backup data accumulated in the upgrade applet instance 32 can be safely moved to the new applet instance 31*b*.

<State Transition of Each Applet>

Figure 5:
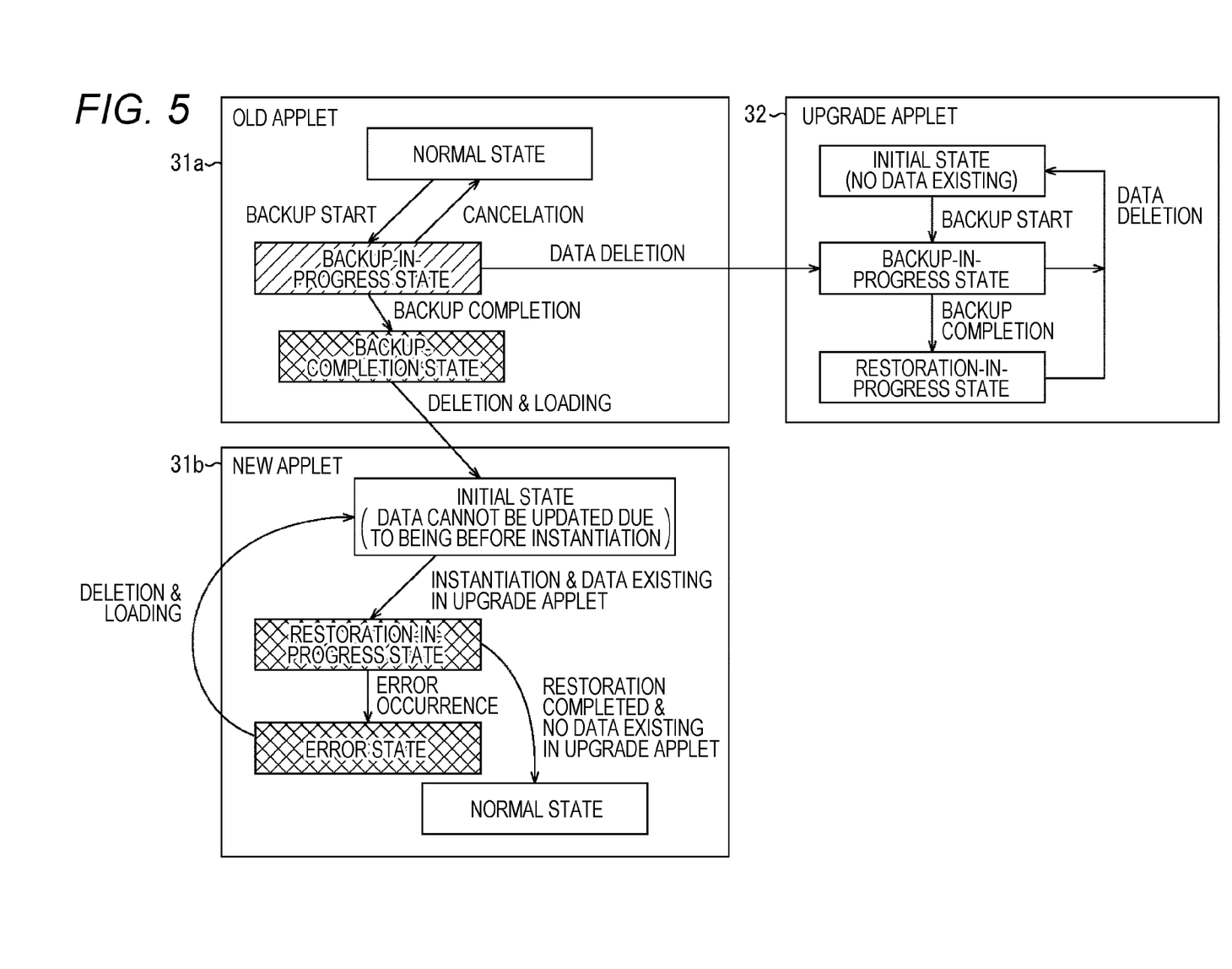
FIG. 5 is a diagram illustrating a state transition of each applet.

Next, state transitions of the old applet 31*a*, new applet 31*b*, and upgrade applet 32 during the processing of updating the applet 31 will be described with reference to FIG. 5.

At a start of the processing of updating the applet 31, the internal state of the old applet 31*a* is set to the normal state. In the normal state, the old applet instance 31*a* can perform normal processing. For example, the old applet instance 31*a* accepts all valid external commands and performs processing corresponding to the accepted external commands.

Furthermore, at a start of the processing of updating the applet 31, the internal state of the upgrade applet 32 is set to the initial state. In the initial state, the upgrade applet instance 32 is in a state where backup data is not accumulated therein (a state where no data exists).

Next, after backup authentication between the old applet instance 31*a* and the upgrade applet instance 32 succeeds, the internal state of the old applet 31*a* transitions from the normal state to the backup-in-progress state at a start of the backup processing. In the backup-in-progress state, the old applet instance 31*a* performs backup processing with the upgrade applet instance 32, and restricts processing by an external command. Specifically, the old applet instance 31*a* accepts only a select command, performs processing corresponding to the select command, and does not accept other external commands. A select command is an external command that is always transmitted at a start of a new session (new processing).

Furthermore, when the upgrade applet instance 32 starts receiving backup data from the old applet instance 31*a*, the internal state of the upgrade applet 32 transitions from the initial state to the backup-in-progress state. In the backup-in-progress state, the upgrade applet instance 32 performs backup processing with the old applet 31*a*.

Next, after the backup processing between the old applet 31*a* and the upgrade applet 32 is completed, the old applet 31*a* transitions from the backup-in-progress state to the backup-completion state. In the backup-completion state, the old applet instance 31*a* does not accept any external command, and does not perform processing with the external command. That is, the old applet instance 31*a* gives priority to processing of updating the applet 31 and does not execute another processing. With this arrangement, it is possible to prevent occurrence of inconsistency between the internal data of the old applet instance 31*a* and data backed up in the upgrade applet 32 caused by, for example, the old applet instance 31*a* executing another processing, whereby updating the internal data.

Furthermore, after the backup processing between the old applet instance 31*a* and the upgrade applet instance 32 is completed, the internal state of the upgrade applet 32 transitions from the backup-in-progress state to the restoration-in-progress state.

Meanwhile, in the backup-in-progress state, in a case of having received the select command, the old applet instance 31*a* cancels the processing of updating the applet 31, and transmits a message instructing data deletion to the upgrade applet instance 32. Furthermore, the internal state of the old applet 31*a* returns from the backup-in-progress state to the normal state, and the old applet instance 31*a* starts a session corresponding to the select command. That is, in a case where the old applet instance 31*a* in the backup-in-progress state is instructed to start a new session, the old applet instance 31*a* gives priority to processing corresponding to the new session over processing of updating the applet 31.

Furthermore, in a case of having received a data deletion message from the old applet instance 31*a*, the upgrade applet instance 32 deletes the internally accumulated backup data, and stops the processing of updating the applet 31. Then, the internal state of the upgrade applet 32 returns to the initial state. With this arrangement, even if the old applet instance 31*a* performs processing corresponding to the new session, and the internal data is updated, it is possible to prevent occurrence of inconsistency between the internal data of the old applet instance 31*a* and the backup data.

Furthermore, in the backup-completion state, the packages of the old applet instance 31*a* and old applet 31*a* are deleted from the eSE chip 22. Moreover, the package of the new applet 31*b* is loaded on the SE chip 22. At this time, the internal state of the new applet 31*b* is set to the initial state.

In the initial state, the new applet 31b is before instantiation, and therefore cannot execute processing such as updating of the internal data.

Then, in a case where the new applet 31b is instantiated, and data exists in the upgrade applet 32, that is, in a case where the upgrade applet 32 has backed up the internal data of the old applet 31a, the internal state of the new applet 31b transitions from the initial state to the restoration-in-progress state. In the restoration-in-progress state, the new applet instance 31b does not accept any external command, and does not perform processing with the external command. That is, the new applet instance 31b gives priority to processing of updating the applet 31 and does not execute another processing. With this arrangement, it is possible to prevent accumulation, in the new applet instance 31b, of data that does not exist in the data backed up in the upgrade applet instance 32, the accumulation being caused by, for example, the new applet instance 31b executing another processing, whereby updating the internal data.

Furthermore, in a case where, in the restoration-in-progress state, an error occurs in the processing of updating the applet 31 due to an error in the restoration authentication or the like, the internal state of the new applet 31b transitions to an error state. In the error state, similarly to a case of a restoration state, the new applet instance 31b does not accept any external command, and does not perform processing with the external command.

Then, in the error state, the packages of the new applet instance 31b and new applet 31b are deleted from the eSE chip 22. Furthermore, the package of a renewed new applet 31b is loaded on the SE chip 22. Then, the processing is performed again from the instantiation of the new applet 31b.

Meanwhile, after the restoration processing between the upgrade applet 32 and the new applet 31b is completed, the backup data in the upgrade applet instance 32 is deleted, and the internal state of the upgrade applet 32 returns from the restoration-in-progress state to the initial state. Furthermore, after the backup data in the upgrade applet 32 is deleted, by which no internal data exists, the internal state of the new applet 31b transitions from the restoration-in-progress state to the normal state, similar to the above-described old applet 31a.

Thus, the states of the old applet 31a, new applet 31b, and upgrade applet 32 are managed in conjunction with one another to prevent the old applet instance 31a or new applet instance 31b from performing processing other than the update processing during processing of updating the applet 31, whereby updating the internal data. That is, in a state where backup data is accumulated in the upgrade applet instance 32, update of the internal data of the old applet instance 31a or new applet instance 31b is prevented. With this arrangement, inconsistency of data between before and after update of the applet 31 is prevented.

2. Modifications

Hereinafter, modifications of the above-described embodiment of the present technology will be described.

The present technology is not limited to the examples described above, and can be applied in a case where various software, such as an operating system or application software, is updated.

Furthermore, the present technology can be applied not only in a case where software is updated, but also in a case where, for example, data is transferred between different pieces of software, that is, a case where data is moved from one piece of software to another piece of software. Note that, in this case, data in software of transfer source may or may not be deleted after the transfer.

Moreover, methods for the backup authentication and restoration authentication are not limited to the methods described above, and another method can be applied.

3. Others

<Configuration Example of Computer>

The above-described series of processing can be executed by hardware or can be executed by software. In a case where a series of processing is executed by software, a program included in the software is installed on a computer. Here, the computer includes, a computer incorporated in dedicated hardware, a general-purpose personal computer for example, which is capable of executing various kinds of functions by installing various programs, or the like.

Figure 6:
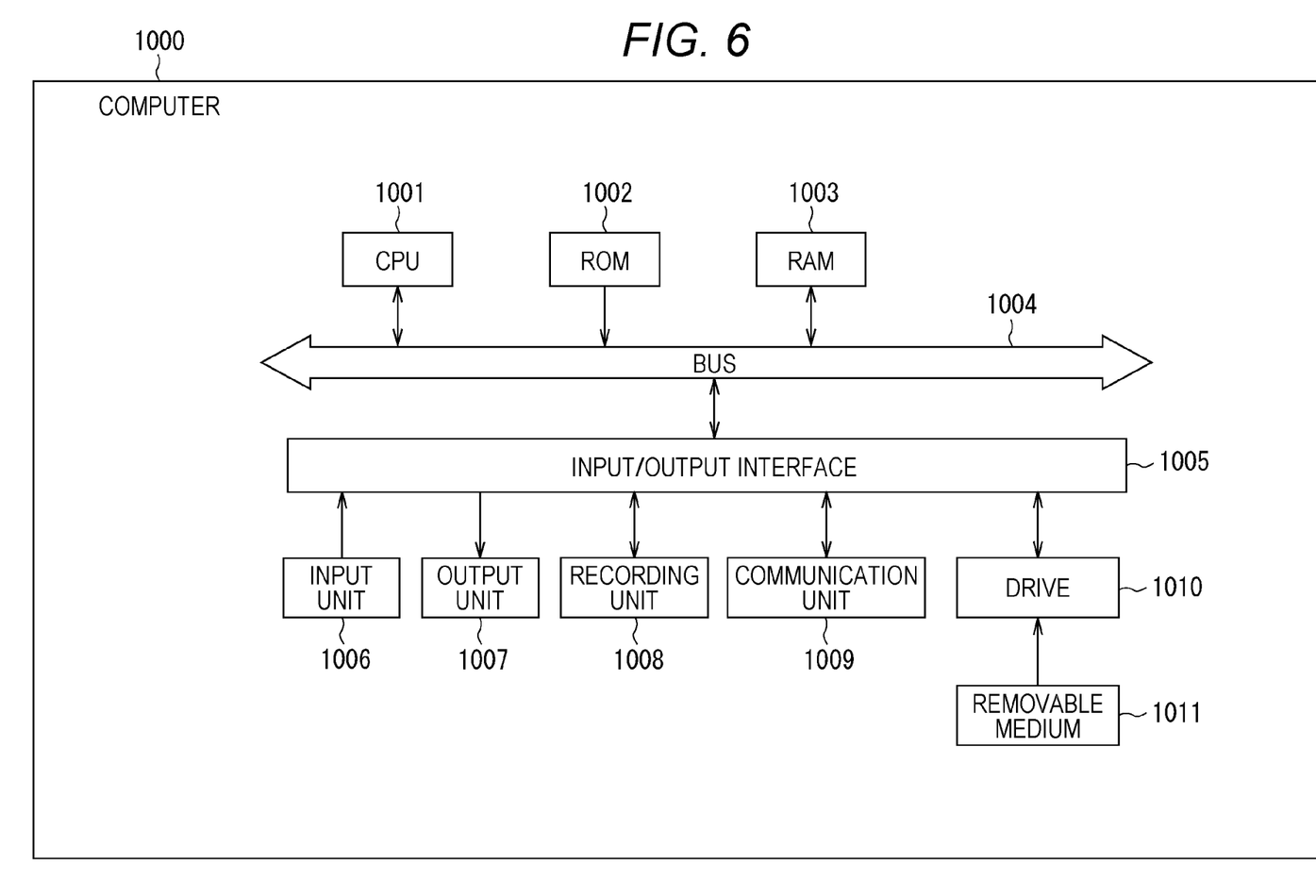
FIG. 6 is a diagram illustrating a configuration example of a computer.

FIG. 6 is a block diagram illustrating a configuration example of hardware of a computer that executes the series of processing described above by a program.

In a computer 1000, a central processing unit (CPU) 1001, a read only memory (ROM) 1002, and a random access memory (RAM) 1003 are mutually connected by a bus 1004.

Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an image sensor, or the like. The output unit 1007 includes a display, a speaker, or the like. The recording unit 1008 includes a hard disk, a non-volatile memory, or the like. The communication unit 1009 includes a network interface, or the like. The drive 1010 drives a removable medium 1011 such as a magnetic disk, an optical disk, a magneto-optical disk, or a semiconductor memory.

In the computer 1000 configured as above, the series of processing described above is executed by the CPU 1001 loading, for example, a program recorded in the recording unit 1008 to the RAM 1003 via the input/output interface 1005 and the bus 1004 and executing the program.

A program executed by the computer 1000 (CPU 1001) can be provided by being recorded on the removable medium 1011 as a package medium, or the like, for example. Furthermore, the program can be provided via a wired or wireless transmission medium such as a local area network, the Internet, or digital satellite broadcasting.

In the computer 1000, the program can be installed on the recording unit 1008 via the input/output interface 1005 by attaching the removable medium 1011 to the drive 1010. Furthermore, the program can be received by the communication unit 1009 via the wired or wireless transmission medium and installed on the recording unit 1008. In addition, the program can be installed on the ROM 1002 or the recording unit 1008 in advance.

Note that, the program executed by the computer may be a program that is processed in time series in an order described in this specification, or a program that is processed in parallel or at a necessary timing such as when a call is made.

Furthermore, in the present specification, the system means a set of a plurality of components (devices, modules (parts), or the like) without regard to whether or not all the components are in the same housing. Therefore, a plurality of devices housed in separate housings and connected via a network, and one device housing a plurality of modules in one housing are both systems.

Moreover, an embodiment of the present technology is not limited to the above-described embodiment, and various changes can be made without departing from the scope of the present technology.

For example, the present technology can have a configuration of cloud computing in which one function is shared and processed jointly by a plurality of devices via a network.

Furthermore, each step described in the above-described flowcharts can be executed by one device, or can be executed by being shared by a plurality of devices.

Moreover, in a case where a plurality of pieces of processing is included in one step, the plurality of pieces of processing included in the one step can be executed by being shared by a plurality of devices, in addition to being executed by one device.

<Examples of Configuration Combination>

The present technology can have the following configurations.

(1)

An information processing device including
a control unit that executes first software, second software, and third software, the information processing device
backing up data in the first software to the second software in a case where first authentication between the first software and the second software succeeds, and
moving the data backed up in the second software to the third software in a case where second authentication between the second software and the third software succeeds.

(2)

The information processing device according to (1),
in which the first software transitions from a first state to a second state after the first authentication succeeds, and transitions from the second state to a third state after the backup of the data to the second software is completed.

(3)

The information processing device according to (2),
in which the first state includes a state of accepting all valid external commands,
the second state includes a state of accepting only a part of external commands, and
the third state includes a state of not accepting all external commands.

(4)

The information processing device according to (2) or (3),
in which, when another processing different from processing under execution is instructed in the second state, the first software gives priority to the another processing, and, when the another processing different from the processing under execution is instructed in the third state, the first software gives priority to the processing under execution.

(5)

The information processing device according to (4),
in which the first software returns to the first state and executes the another processing in a case where the another processing is instructed in the second state, and the second software deletes the backed up data in a case where the first software returns to the first state and executes the another processing.

(6)

The information processing device according to (4) or (5),
in which the processing under execution includes processing of updating the first software to the third software.

(7)

The information processing device according to any one of (1) to (6),
in which the third software transitions from the first state to the second state after acquiring all the data backed up in the second software.

(8)

The information processing device according to (7),
in which the third software transitions from the first state to the second state after acquiring all the data backed up in the second software, and after the data is deleted from the second software.

(9)

The information processing device according to (7) or (8),
in which the first state includes a state of not accepting all external commands, and
the second state includes a state of accepting all valid external commands.

(10)

The information processing device according to any one of (7) to (9),
in which, when another processing different from processing under execution is instructed in the first state, the third software gives priority to the processing under execution.

(11)

The information processing device according to (10),
in which the processing under execution includes processing of updating the first software to the third software.

(12)

The information processing device according to any one of (1) to (11),
in which the first software transmits the data to the second software by using a program for transmission provided from the second software.

(13)

The information processing device according to (12),
in which the second software provides the first software with the program for transmission in a case where the first authentication succeeds.

(14)

The information processing device according to any one of (1) to (13),
in which the third software acquires the data from the second software by using a program for acquisition provided from the second software.

(15)

The information processing device according to (14),
in which the second software provides the third software with the program for acquisition in a case where the second authentication succeeds.

(16)

The information processing device according to any one of (1) to (15),
in which the first software is updated by the third software.

(17)

The information processing device according to any one of (1) to (16),
in which the first software and the third software include an application.

(18)

An information processing method including
backing up data in first software to second software in a case where first authentication between the first software and the second software succeeds, and moving the data backed up in the second software to third software in a case where second authentication between the second software and the third software succeeds.

(19)

A program for causing a computer to execute processing including
backing up data in first software to second software in a case where first authentication between the first software and the second software succeeds, and
moving the data backed up in the second software to third software in a case where second authentication between the second software and the third software succeeds.

(20)

An information processing system including
a first information processing device, and
a second information processing device,
in which the first information processing device backs up data in first software to second software when first authentication between the first software and the second software succeeds, and moves the data backed up in the second software to third software acquired from the second information processing device in a case where second authentication between the second software and the third software succeeds.

Note that the effects described herein are only examples, and the effects of the present technology are not limited to these effects. Additional effects may also be obtained.

REFERENCE SIGNS LIST

11 Information processing device
12 Server
21 Device host
22 eSE chip
23 CLF chip
31 Applet, Applet instance
31a Old applet, Old applet instance
31b New applet, New applet instance
32 Upgrade applet, Upgrade applet instance

The invention claimed is:

1. An information processing device, comprising:
a central processing unit (CPU) configured to:
execute a first software, a second software, and a third software;
set a first state of the first software;
control, in the first state, the first software to accept a plurality of external commands, wherein
each external command of the plurality of external commands is a valid command;
execute, in the first state, a first authentication between the first software and the second software, wherein
the first authentication is based on a specific key, and
the specific key is associated with each of the first software and the second software;
determine that the execution of the first authentication is successful;
control, based on the determination that the execution of the first authentication is successful, the first software to transit from the first state to a second state;
back up, based on the transition of the first software from the first state to the second state, data in the first software to the second software;
control, in the second state, the first software to accept a specific command of the plurality of external commands;
control the first software to transit from the second state to a third state after the back up of the data to the second software is completed;
control, in the third state, the first software to reject the plurality of external commands;
execute a second authentication between the second software and the third software;
determine that the execution of the second authentication is successful; and
transfer the backed up data in the second software to the third software based on the determination that the execution of the second authentication is successful.

2. The information processing device according to claim 1, wherein
the CPU is further configured to control the first software to execute a first processing,
in a case where a second processing different from the first processing under the execution is instructed in the second state, the CPU is further configured to control the first software to prioritize the second processing, and
in a case where the second processing different from the first processing under the execution is instructed in the third state, the CPU is further configured to control the first software to prioritize the first processing.

3. The information processing device according to claim 2, wherein, in the case where the second processing is instructed in the second state, the CPU is further configured to:
control the first software to return to the first state;
control the first software to execute the second processing; and
control the second software to delete the backed up data based on:
the return of the first software to the first state, and
the execution of the second processing.

4. The information processing device according to claim 2, wherein the first processing is to update the first software to the third software.

5. The information processing device according to claim 1, wherein the CPU is further configured to control the third software to transit from a first state of the third software to a second state of the third software, based on the transfer of the backed up data in the second software to the third software.

6. The information processing device according to claim 5, wherein the CPU is further configured to:
control deletion of the backed up data from the second software, and
control the transition of the third software from the first state of the third software to the second state of the third software based on:
the transfer of the backed up data in the second software to the third software, and
the deletion of the backed up data from the second software.

7. The information processing device according to claim 5, wherein the CPU is further configured to:
control, in the first state of the third software, the third software to reject the plurality of external commands, and
control, in the second state of the third software, the third software to accept the plurality of external commands.

8. The information processing device according to claim 5, wherein
the CPU is further configured to control the first software to execute a first processing, and in a case where a second processing different from the first processing is instructed in the first state of the third software, the CPU is further configured to control the third software to prioritize the first processing.

9. The information processing device according to claim 8, wherein the first processing is to update the first software to the third software.

10. The information processing device according to claim 1, wherein the CPU is further configured to:
control the second software to provide a script, and
control the first software to transmit the data in the first software to the second software based on the script provided from the second software.

11. The information processing device according to claim 10, wherein the script is provided based on the determination that the execution of the first authentication is successful.

12. The information processing device according to claim 1, wherein the CPU is further configured to:
control the second software to provide a script to the third software, and
control the third software to acquire the backed up data from the second software, based on the provided script from the second software.

13. The information processing device according to claim 12, wherein the script is provided based on the determination that the execution of the second authentication is successful.

14. The information processing device according to claim 1, wherein the CPU is further configured to update the first software by the third software.

15. The information processing device according to claim 1, wherein each of the first software and the third software includes an application.

16. An information processing method, comprising:
executing a first software, a second software, and a third software;
setting a first state of the first software;
controlling, in the first state, the first software to accept a plurality of external commands, wherein
each external command of the plurality of external commands is a valid command;
executing, in the first state, a first authentication between the first software and the second software, wherein
the first authentication is based on a specific key, and
the specific key is associated with each of the first software and the second software;
determining that the execution of the first authentication is successful;
controlling, based on the determination that the execution of the first authentication is successful, the first software to transit from the first state to a second state;
backing up, based on the transition of the first software from the first state to the second state, data in the first software to the second software;
controlling, in the second state, the first software to accept a specific command of the plurality of external commands;
controlling the first software to transit from the second state to a third state after the back up of the data to the second software is completed;
controlling, in the third state, the first software to reject the plurality of external commands;
executing a second authentication between the second software and the third software;
determining that the execution of the second authentication is successful; and
transferring the backed up data in the second software to the third software based on the determination that the execution of the second authentication is successful.

17. A non-transitory computer readable medium having stored thereon, computer-executable instructions, which when executed by a computer, cause the computer to execute operations, the operations comprising:
executing a first software, a second software, and a third software;
setting a first state of the first software;
controlling, in the first state, the first software to accept a plurality of external commands, wherein
each external command of the plurality of external commands is a valid command;
executing, in the first state, a first authentication between the first software and the second software, wherein
the first authentication is based on a specific key, and
the specific key is associated with each of the first software and the second software;
determining that the execution of the first authentication is successful;
controlling, based on the determination that the execution of the first authentication is successful, the first software to transit from the first state to a second state;
backing up, based on the transition of the first software from the first state to the second state, data in the first software to the second software;
controlling, in the second state, the first software to accept a specific command of the plurality of external commands;
controlling the first software to transit from the second state to a third state after the back up of the data to the second software is completed;
controlling, in the third state, the first software to reject the plurality of external commands;
executing a second authentication between the second software and the third software;
determining that the execution of the second authentication is successful; and
transferring the backed up data in the second software to the third software based on the determination that the execution of the second authentication is successful.

18. An information processing system, comprising:
a first information processing device comprising a central processing unit (CPU); and
a second information processing device, wherein the CPU is configured to:
execute a first software and a second software;
set a first state of the first software;
control, in the first state, the first software to accept a plurality of external commands, wherein
each external command of the plurality of external commands correspond to a valid command;
execute, in the first state, a first authentication between the first software and the second software, wherein
the first authentication is based on a specific key, and
the specific key is associated with each of the first software and the second software;
determine that the execution of the first authentication is successful;
control, based on the determination that the execution of the first authentication is successful, the first software to transit from the first state to a second state;
back up, based on the transition of the first software from the first state to the second state, data in the first software to the second software;

control, in the second state, the first software to accept a specific command of the plurality of external commands;
control the first software to transit from the second state to a third state after the back up of the data to the second software is completed;
control, in the third state, the first software to reject the plurality of external commands;
acquire a third software from the second information processing device;
execute a second authentication between the second software and the third software;
determine that the execution of the second authentication is successful; and
transfer the backed up data in the second software to the third software based on the determination that the execution of the second authentication is successful.

* * * * *